United States Patent
Ho et al.

(10) Patent No.: US 9,472,116 B2
(45) Date of Patent: *Oct. 18, 2016

(54) COMPUTING METHOD AND SYSTEM WITH DETACHED SENSOR IN A NETWORK ENVIRONMENT

(71) Applicant: IPLEARN-FOCUS, LLC, Mountain View, CA (US)

(72) Inventors: Chi Fai Ho, Palo Alto, CA (US); Peter P. Tong, Mountain View, CA (US)

(73) Assignee: IPLEARN-FOCUS, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,930

(22) Filed: Dec. 21, 2015

(65) Prior Publication Data

US 2016/0111012 A1     Apr. 21, 2016

Related U.S. Application Data

(63) Continuation of application No. 14/663,947, filed on Mar. 20, 2015, now Pat. No. 9,224,304, which is a continuation of application No. 14/017,599, filed on Sep. 4, 2013, now Pat. No. 9,123,255, which is a
(Continued)

(51) Int. Cl.
*G09B 5/00* (2006.01)
*G09B 7/04* (2006.01)
(Continued)

(52) U.S. Cl.
CPC . *G09B 7/04* (2013.01); *G09B 5/00* (2013.01); *G09B 5/14* (2013.01); *G09B 5/065* (2013.01); *G09B 7/00* (2013.01)

(58) Field of Classification Search
CPC ............ G09B 5/00; G09B 5/04; G09B 5/06; G09B 5/065; G09B 7/00
See application file for complete search history.

(56) References Cited

U.S. PATENT DOCUMENTS 3,573,359 A    4/1971  Guisinger
3,685,169 A    8/1972  Blau et al.
(Continued)

FOREIGN PATENT DOCUMENTS

EP    0 055 338 A1    7/1982
JP    11276461 A     10/1999
WO    96/15837       5/1996

OTHER PUBLICATIONS

Kanade, Takeo, *Computer Recognition of Human Faces*, 1977, cover and 2 additional at the end pages, pp. i-iv, 1-87, 89-91, 93-96, and 2 additonal pages.
(Continued)

*Primary Examiner* — Robert J Utama

(57) ABSTRACT

One embodiment includes a computer-implemented method and system in a network environment using at least a display and a detached sensor. Another embodiment includes a computer-implemented system helping a user learn using a detached imaging sensor. In yet another embodiment, a computer-implemented system monitors automatically more than once a user's behavior while the user is working on materials. Through monitoring the user's voluntary or involuntary behavior, the system determines what to present by the display. The presentation could include providing rewards, punishments, stimulation, and other materials. The system can also react by asking the user a question. Based on the user's response, the system may change to more appropriate materials, or different presentation styles.

20 Claims, 6 Drawing Sheets

Related U.S. Application Data continuation of application No. 13/831,568, filed on Mar. 14, 2013, now Pat. No. 8,538,321, which is a continuation of application No. 13/481,821, filed on May 26, 2012, now Pat. No. 8,475,174, which is a continuation of application No. 10/694,706, filed on Oct. 28, 2003, now Pat. No. 8,398,407, which is a continuation of application No. 10/050,578, filed on Jan. 14, 2002, now Pat. No. 6,699,043, which is a continuation of application No. 09/385,795, filed on Aug. 30, 1999, now abandoned, which is a continuation of application No. 08/689,678, filed on Aug. 13, 1996, now Pat. No. 5,944,530.

(51) Int. Cl.
  *G09B 5/14* (2006.01)
  *G09B 7/00* (2006.01)
  *G09B 5/06* (2006.01)

(56) References Cited

U.S. PATENT DOCUMENTS

| | | | |
|---|---|---|---|
| 4,006,539 A | 2/1977 | Slomski | |
| 4,037,332 A | 7/1977 | Petrusinsky | |
| 4,089,124 A | 5/1978 | Burtis et al. | |
| 4,464,121 A | 8/1984 | Perelli | |
| 4,539,585 A | 9/1985 | Spackova et al. | |
| 4,702,575 A | 10/1987 | Breglia | |
| 4,705,479 A | 11/1987 | Maron | |
| 4,706,072 A | 11/1987 | Ikeyama | |
| 4,798,543 A | 1/1989 | Spiece | |
| 4,843,568 A | 6/1989 | Krueger et al. | |
| 4,867,685 A | 9/1989 | Brush et al. | |
| 4,894,777 A | 1/1990 | Negishi et al. | |
| 4,984,179 A | 1/1991 | Waldern | |
| 5,012,522 A | 4/1991 | Lambert | |
| 5,016,282 A | 5/1991 | Tomono et al. | |
| 5,035,625 A | 7/1991 | Munson et al. | |
| 5,072,294 A | 12/1991 | Engle | |
| 5,138,555 A | 8/1992 | Albrecht | |
| 5,168,531 A | 12/1992 | Sigel | |
| 5,211,563 A | 5/1993 | Haga et al. | |
| 5,227,985 A | 7/1993 | DeMenthon | |
| 5,231,674 A | 7/1993 | Cleveland et al. | |
| 5,267,865 A | 12/1993 | Lee et al. | |
| 5,286,036 A | 2/1994 | Barabash | |
| 5,295,491 A | 3/1994 | Gevins | |
| 5,297,061 A | 3/1994 | Dementhon et al. | |
| 5,306,154 A * | 4/1994 | Ujita | G09B 7/04 376/216 |
| 5,320,538 A | 6/1994 | Baum | |
| 5,325,133 A | 6/1994 | Adachi | |
| 5,333,272 A | 7/1994 | Capek et al. | |
| 5,339,826 A | 8/1994 | Schmidt et al. | |
| 5,362,069 A | 11/1994 | Hall-Tipping | |
| 5,370,399 A | 12/1994 | Liverance | |
| 5,372,507 A * | 12/1994 | Goleh | G09B 7/04 434/118 |
| 5,404,426 A * | 4/1995 | Usami | G06T 13/40 345/420 |
| 5,423,554 A | 6/1995 | Davis | |
| 5,437,553 A | 8/1995 | Collins et al. | |
| 5,454,043 A | 9/1995 | Freeman | |
| 5,458,494 A | 10/1995 | Krohn et al. | |
| 5,459,793 A | 10/1995 | Naoi et al. | |
| 5,473,705 A | 12/1995 | Abe et al. | |
| 5,494,444 A * | 2/1996 | Thayer | G09B 7/02 273/430 |
| 5,495,576 A | 2/1996 | Ritchey | |
| 5,534,917 A | 7/1996 | MacDougall | |
| 5,535,422 A | 7/1996 | Chiang et al. | |
| 5,546,598 A | 8/1996 | Yamaguchi et al. | |
| 5,577,919 A | 11/1996 | Collins et al. | |
| 5,577,981 A | 11/1996 | Jarvik | |
| 5,581,276 A | 12/1996 | Cipolla et al. | |
| 5,594,469 A | 1/1997 | Freeman et al. | |
| 5,595,488 A | 1/1997 | Gozlan et al. | |
| 5,597,312 A | 1/1997 | Bloom et al. | |
| 5,617,312 A | 4/1997 | Iura et al. | |
| 5,681,170 A | 10/1997 | Rieber et al. | |
| 5,689,575 A | 11/1997 | Sako et al. | |
| 5,724,987 A | 3/1998 | Gevins et al. | |
| 5,727,950 A * | 3/1998 | Cook | G09B 5/02 434/350 |
| 5,730,604 A * | 3/1998 | Jay | G09B 5/065 434/169 |
| 5,738,527 A | 4/1998 | Lundberg | |
| 5,772,522 A | 6/1998 | Nesbit et al. | |
| 5,774,591 A | 6/1998 | Black et al. | |
| 5,788,504 A * | 8/1998 | Rice | G09B 19/0069 434/219 |
| 5,797,754 A * | 8/1998 | Griswold | G09B 7/04 434/322 |
| 5,807,114 A | 9/1998 | Hodges et al. | |
| 5,829,983 A * | 11/1998 | Koyama | G09B 7/04 434/118 |
| 5,896,128 A | 4/1999 | Boyer | |
| 5,900,827 A | 5/1999 | Graham et al. | |
| 5,913,727 A | 6/1999 | Ahdoot | |
| 5,944,530 A | 8/1999 | Ho et al. | |
| 5,982,352 A | 11/1999 | Pryor | |
| 5,987,302 A * | 11/1999 | Driscoll | G09B 5/065 382/321 |
| 6,034,652 A | 3/2000 | Freiberger et al. | |
| 6,053,739 A | 4/2000 | Stewart et al. | |
| 6,141,431 A * | 10/2000 | Munetsugu | G06K 9/00281 348/597 |
| 6,149,438 A * | 11/2000 | Richard | G09B 7/02 434/322 |
| 6,149,441 A * | 11/2000 | Pellegrino | G09B 7/02 434/118 |
| 6,162,060 A | 12/2000 | Richard et al. | |
| 6,186,794 B1 | 2/2001 | Brown et al. | |
| 6,285,379 B1 | 9/2001 | Gallery | |
| 6,453,052 B1 * | 9/2002 | Kurokawa | G06T 7/0028 30/30 |
| 6,699,043 B2 | 3/2004 | Ho et al. | |
| 7,657,866 B2 * | 2/2010 | Cope | G06F 8/61 707/636 |
| 8,538,320 B2 | 9/2013 | Ho et al. | |
| 2003/0065578 A1 * | 4/2003 | Peyrelevade | A45D 44/005 705/14.54 |
| 2005/0153263 A1 * | 7/2005 | De Ley | G09B 5/00 434/169 |
| 2006/0204055 A1 * | 9/2006 | Steinberg | H04N 5/23212 382/118 |

OTHER PUBLICATIONS

Azarbayejani et al. "Real-time self-calibrating stereo person tracking using 3-D shape estimation from blob features," MIT Media Laboratory, Perceptual Computing Technical Report #363, Jan. 1996, 6 pages. (Appears in: ICPR '96 Vienna, Austria, Aug. 1996).

Azarbayejani et al. "Visually Controlled Graphics," IEEE Transactions on Pattern Analysis and Machine Intelligence, vol. 15, No. 6, Jun. 1993, pp. 602-605.

Baudel et al. "Charade: Remote Control of Objects Using Free-Hand Gestures," Communications of the ACM, vol. 36, No. 7, Jul. 1993, pp. 28, 30-35.

Bieniek, Chris. "The Atari Quest. An Ultimate Gamer Exclusive," Ultimate Gamer, Jan. 1996, front cover, table of contents and pp. 60-65.

Black et al. "Tracking and Recognizing Rigid and Non-Rigid Facial Motions Using Local Parametric Models of Image Motion," Proc. Fifth Int. Conf. on Computer Vision (ICCV'95), Boston, Jun. 1995, pp. 1-8.

Blake et al. "3D position, attitude and shape input using video tracking of hands and lips," Robotics Research Group, University of Oxford, 9 pages.

Bowden et al. "Real Time Hand Tracking and Gesture Recognition as a 3D Input Device for Graphical Applications," School of Computer Studies, University of Leeds, 10 pages.

(56) References Cited

OTHER PUBLICATIONS

Bolt, Richard A. ""Put-That-There": Voice and Gesture at the Graphics Interface," Association for Computing Machinery, © 1980, pp. 262-270.
Bolt, Richard A. "Spatial Data-Management," Massachusetts Institute of Technology, © 1979, front and back covers, pp. 1-60. [Part 1].
Bolt, Richard A. "Spatial Data-Management," Massachusetts Institute of Technology, © 1979, front and back covers, pp. 1-60. [PART2].
Bolt et al. "Two-Handed Gesture in Multi-Modal Natural Dialog," UIST '92, Nov. 15-18, 1992, Association for Computing Machinery, © 1992, pp. 7-14.
Cohen et al. "Synergistic Use of Direct Manipulation and Natural Language," CHI '89 Proceedings, May 1989, Association for Computing Machinery, © 1989, pp. 227-233.
Darrell et al. "A Novel Environment for Situated Vision and Behavior," MIT Media Laboratory Perceptual Computing Technical Report No. 261, Presented at IEEE Workshop for Visual Behaviors, CVPR-94, pp. 1-7.
Darrell et al. "Attention-driven Expression and Gesture Analysis in an Interactive Environment," MIT Media Laboratory Vision and Modeling Group Technical Report No. 312, 6 pages. (Appeared, Intl. Workshop on Automatic Face and Gesture Recognition, Zurich, Jul. 1995).
Darrell et al. "Space-Time Gestures," IEEE, © 1993, pp. 335-340.
Davis et al. "Recognizing Hand Gestures," ECCV-94, Stockholm, Sweden, May 2-6, 1994, 10 pages.
De Silva, L. C., et al. "Detection and Tracking of Facial Features," SPEI, vol. 2501, pp. 1161-1172. [downloaded from http://proceedings.spiedigitallibrary.org/ on Aug. 28, 2014].
Epworth, Richard. "Eye Movements, for a Bidirectional Human Interface," ICL 411.Technical Journal, Nov. 1990, pp. 384-411.
Freeman et al. "Television Control by Hand Gestures," Mitsubishi Electric Research Laboratories, Dec. 1994 (from IEEE Intl. Workshop on Automatic Face and Gesture Recognition, Zurich, Jun. 1995), 6 pages.
Freeman et al. "Orientation Histograms for Hand Gesture Recognition," Mitsubishi Electric Research Laboratories, (from IEEE Intl. Workshop on Automatic Face and Gesture Recognition, Zurich, Jun. 1995), Dec. 1994, 9 pages.
Funkhouser et al. "Adaptive Display Algorithm for Interactive Frame Rates During Visualization of Complex Virtual Environments," Association for Computing Machinery, © 1993, pp. 247-254.
Fukumoto el al. ""Finger-Pointer": Pointing Interface by Image Processing," Computer & Graphics, vol. 18, No. 5, 1994, pp. 633-642.
Fukumoto et al. "Finger-Pointer: A Glove Free Interface," allegedly Proc. CHI 92 Posters and Short Talks of the 1992 SIGCHI conference on human factors in computing systems, 1992, 1 page.
Hauptmann, Alexander G. "Speech and Gestures for Graphic Image Manipulation," CHI '89 Proceedings,May 1989, Association for Computing Machinery, © 1989, pp. 241-245.
Hutchinson et al. "Human-Computer Interaction Using Eye-Gaze Input," IEEE Transactions on Systems, Man and Cybernetics, vol. 19, No. 6, Nov./Dec. 1989, pp. 1527-1534.
Jacob, Robert J.K. "The Use of Eye Movements in Human-Computer Interaction Techniques: What You Look At is What You Get," ACM Transactions on Information Systems, vol. 9, No. 3, Apr. 1991, pp. 152-169.
Kuch et al. "Vision Based Hand Modeling and Tracking for Virtual Teleconferencing and Telecollaboration," IEEE, © 1995, pp. 666-671.
Maes et al. "The Alive System: Full-body Interaction with Autonomous Agents," IEEE, © 1995, pp. 11-18.
Maggioni, Christoph. "A Novel Gestural Input Device for Virtual Reality," IEEE, © 1993, pp. 118-124.
Meyer et al. "A Survey of Position Trackers," Presence. Teleoperators and Virtual Environments, vol. 1, No. 2, Spring 1992, © 1992 The Massachusetts Institute of Technology, front covers and table of contents and pp. 173-200.
Pentland, Alex P. "Smart Rooms," Scientific American, Apr. 1996, pp. 68-76.
Pentland, Alex P. "Toward Augmented Control Systems," allegedly Proc. Intelligent Vehicles, vol. 1, 1995, pp. 350-355.
Rehg et al. "DigitEyes: Vision-Based Hand Tracking for Human-Computer Interaction," IEEE, © 1994, pp. 16-22.
Russell et al. "Unencumbered Virtual Environments, Perceptual Computing Section," Perceptual Computing Section, The Media Laboratory, Massachusetts Institute of Technology, 5 pages.
Sparacino et al. "HyperPlex: a World of 3D Interactive Digital Movies," The Media Laboratory, Massachusetts Institute of Technology, 5 pages.
Starker et al. "A Gaze-Responsive Self-Disclosing Display," CHI '90 Proceedings, Apr. 1990, Association for Computing Machinery, © 1990, pp. 3-9.
Starner, Thad Eugene. "Visual Recognition of American Sign Language Using Hidden Markov Models," © Massachusetts Institute of Technology, 1995, pp. 1-52.
Sturman et al. "Hands-on Interaction with Virtual Environments," Association for Computing Machinery, © 1989, pp. 19-24.
Suenaga et al. "Human Reader: An Advanced Man-Machine Interface Based on Human Images and Speech," Systems and Computers in Japan, vol. 24, No. 2, © 1993, pp. 88-102. (Translated from Denshi Joho Tsushin Gakkai Ronbunshi, vol. 75-D-II, No. 2, Feb. 1992, pp. 190-202.).
Turk et al. "Face Recognition Using Eigenfaces," IEEE, © 1991, pp. 586-591.
Ware et al. "An Evaluation of an Eye Tracker as a Device for Computer Input," CHI + GI 1987, Associate for Computing Machinery, © 1987, pp. 183-188.
Wren et al. "Pfinder: Real-Time Tracking of the Human Body," SPIE, vol. 2615, downloaded from http://proceedings.spiedigitallibrary.org/ on Jul. 18, 2014, pp. 89-98.
Yoo, Tae-Woong et al. "A method for real-time face region tracking based on color histogram," SPEI, vol. 2739, pp. 361-365. [downloaded from http://proceedings.spiedigitallibrary.org/ on Oct. 20, 2014.
Sega Activator Training Video, Sega, copyright 1994 (DVD).
Sega Activator, demonstration, Sega (DVD).
Sega Activator, demonstration, The Home Show from ABC (DVD).
Sega Activator, demonstration, allegedly 1993 WCES at Las Vegas, Sega (DVD).
Sega Activator, Siskel & Ebert's Holiday Video Gift Guide, allegedly 1993 (DVD).
Microsoft Corporation's Answer and Counterclaims, C.A. No. 4:14-cv-00151-PJH, filed Mar. 21, 2014, pp. 1-12.
Microsoft Corporation's Patent Local Rule 3-3 Invalidity Contentions, C.A. No. 3:14-cv-00151-JD, filed Jul. 21, 2014, 17 pages.
Attachment A, Microsoft Corporation's Patent Local Rule 3-3 Invalidity Contentions, C.A. No. 3:14-cv-00151-JD, filed Jul. 21, 2014, 53 pages.
Attachment B, Microsoft Corporation's Patent Local Rule 3-3 Invalidity Contentions, C.A. No. 3:14-cv-00151-JD, filed Jul. 21, 2014, 81 pages.
Attachment C, Microsoft Corporation's Patent Local Rule 3-3 Invalidity Contentions, C.A. No. 3:14-cv-00151-JD, filed Jul. 21, 2014, 41 pages.
Attachment D, Microsoft Corporation's Patent Local Rule 3-3 Invalidity Contentions, C.A. No. 3:14-cv-00151-JD, filed Jul. 21, 2014, 107 pages.
Attachment E, Microsoft Corporation's Patent Local Rule 3-3 Invalidity Contentions, C.A. No. 3:14-cv-00151-JD, filed Jul. 21, 2014, 94 pages.
Attachment F, Microsoft Corporation's Patent Local Rule 3-3 Invalidity Contentions, C.A. No. 3:14-cv-00151-JD, filed Jul. 21, 2014, 62 pages.
Attachment G, Microsoft Corporation's Patent Local Rule 3-3 Invalidity Contentions, C.A. No. 3:14-cv-00151-JD, filed Jul. 21, 2014, 38 pages.

(56) References Cited

OTHER PUBLICATIONS

Attachment H, Microsoft Corporation's Patent Local Rule 3-3 Invalidity Contentions, C.A. No. 3:14-cv-00151-JD, filed Jul. 21, 2014, 62 pages.
Attachment I, Microsoft Corporation's Patent Local Rule 3-3 Invalidity Contentions, C.A. No. 3:14-cv-00151-JD, filed Jul. 21, 2014, 60 pages.
Attachment J, Microsoft Corporation's Patent Local Rule 3-3 Invalidity Contentions, C.A. No. 3:14-cv-00151-JD, filed Jul. 21, 2014, 36 pages.
Attachment K, Microsoft Corporation's Patent Local Rule 3-3 Invalidity Contentions, C.A. No. 3:14-cv-00151-JD, filed Jul. 21, 2014, 70 pages.
Attachment L, Microsoft Corporation's Patent Local Rule 3-3 Invalidity Contentions, C.A. No. 3:14-cv-00151-JD, filed Jul. 21, 2014, 63 pages.
Attachment M, Microsoft Corporation's Patent Local Rule 3-3 Invalidity Contentions, C.A. No. 3:14-cv-00151-JD, filed Jul. 21, 2014, 53 pages.
Attachment N, Microsoft Corporation's Patent Local Rule 3-3 Invalidity Contentions, C.A. No. 3:14-cv-00151-JD, filed Jul. 21, 2014, 43 pages.
Attachment O, Microsoft Corporation's Patent Local Rule 3-3 Invalidity Contentions, C.A. No. 3:14-cv-00151-JD, filed Jul. 21, 2014, 45 pages.
Attachment P, Microsoft Corporation's Patent Local Rule 3-3 Invalidity Contentions, C.A. No. 3:14-cv-00151-JD, filed Jul. 21, 2014, 66 pages.
Attachment Q, Microsoft Corporation's Patent Local Rule 3-3 Invalidity Contentions, C.A. No. 3:14-cv-00151-JD, filed Jul. 21, 2014, 46 pages.
Attachment R, Microsoft Corporation's Patent Local Rule 3-3 Invalidity Contentions, C.A. No. 3:14-cv-00151-JD, filed Jul. 21, 2014, 81 pages.
Attachment S, Microsoft Corporation's Patent Local Rule 3-3 Invalidity Contentions, C.A. No. 3:14-cv-00151-JD, filed Jul. 21, 2014, 35 pages.
Attachment T, Microsoft Corporation's Patent Local Rule 3-3 Invalidity Contentions, C.A. No. 3:14-cv-00151-JD, filed Jul. 21, 2014, 67 pages.
Attachment U, Microsoft Corporation's Patent Local Rule 3-3 Invalidity Contentions, C.A. No. 3:14-cv-00151-JD, filed Jul. 21, 2014, 49 pages.
Attachment V, Microsoft Corporation's Patent Local Rule 3-3 Invalidity Contentions, C.A. No. 3:14-cv-00151-JD, filed Jul. 21, 2014, 56 pages.
Attachment W, Microsoft Corporation's Patent Local Rule 3-3 Invalidity Contentions, C.A. No. 3:14-cv-00151-JD, filed Jul. 21, 2014, 54 pages.
Attachment X, Microsoft Corporation's Patent Local Rule 3-3 Invalidity Contentions, C.A. No. 3:14-cv-00151-JD, filed Jul. 21, 2014, 93 pages.
Attachment Y, Microsoft Corporation's Patent Local Rule 3-3 Invalidity Contentions, C.A. No. 3:14-cv-00151-JD, filed Jul. 21, 2014, 69 pages.
Attachment Z, Microsoft Corporation's Patent Local Rule 3-3 Invalidity Contentions, C.A. No. 3:14-cv-00151-JD, filed Jul. 21, 2014, 44 pages.
Mircrosoft Corporation's Answer and Counterclaims, C.A. No. 4:14-cv-00151-PJH, filed Mar. 21, 2014, pp. 1-12.
IpLearn-Focus's Corrected Claim Construction and Prehearing Statement, C.A. 3:14-cv-00151-JD, filed Sep. 19, 2014, pp. 1-17.
Microsoft Corporation's Petition for Inter Partes Review, Re U.S. Pat. No. 8,475,174, filed Oct. 20, 2014, pp. 1-65.
Exhibit 1003 of Microsoft Corporation's Petition for Inter Partes Review, Re U.S. Pat. No. 8,475,174, filed Oct. 20, 2014, pp. 1-110.
Microsoft Corporation's Petition for Inter Partes Review, Re U.S. Pat. No. 8,538,320, filed Oct. 20, 2014, pp. 1-63.
Exhibit 1003 of Microsoft Corporation's Petition for Inter Partes Review, Re U.S. Pat. No. 8,538,320, filed Oct. 20, 2014, pp. 1-113.
Microsoft Corporation's Petition for Inter Partes Review, Re U.S. Pat. No. 8,538,321, filed Oct. 20, 2014, pp. 1-66.
Exhibit 1003 of Microsoft Corporation's Petition for Inter Partes Review, Re U.S. Pat. No. 8,538,321, filed Oct. 20, 2014, pp. 1-128.
IpLearn-Focus's Opening Claim Construction Brief, Case No. 3:14-cv-00151-JD, filed Nov. 3, 2014, pp. 1-26.
Microsoft corporation's Responsive Claim Construction Brief, Case No. 3:14-cv-00151-JD, Filed Nov. 17, 2014, pp. 1-26.
Declaration of David Forsyth, Case No. 3:14-cv-00151-JD, filed Nov. 17, 2014, pp. 1-22.
IpLearn-Focus's Claim Construction Reply Brief, Case No. 3:14-cv-00151-JD, filed Nov. 24, 2014, pp. 1-15.
Deposition of David Crane, Case No. 3:14-cv-00151-JD, filed Nov. 24, 2014, pp. 1-31.
Microsoft Corporation's Motion for Summary Judgment, C.A. 3:14-cv-00151-JD, filed Feb. 4, 2015, pp. 1-21.
Exhibit 1, Microsoft Corporation's Motion for Summary Judgment, C.A. 3:14-cv-00151-JD, filed Feb. 4, 2015, pp. 1-9.
IpLearn-Focus's Response in Opposition to Microsoft's Motion for Summary Judgment, C.A. 3:14-00151-JD, filed Feb. 18, 2015, pp. 1-25.
Exhibit A, IpLearn-Focus's Response in Opposition to Microsoft's Motion for Summary Judgment, C.A. 3:14-00151-JD, filed Feb. 18, 2015, pp. 1-14.
Exhibit C, IpLearn-Focus's Response in Opposition to Microsoft's Motion for Summary Judgment, C.A. 3:14-00151-JD, filed Feb. 18, 2015, pp. 1-17.
Exhibit D, IpLearn-Focus's Response in Opposition to Microsoft's Motion for Summary Judgment, C.A. 3:14-00151-JD, filed Feb. 18, 2015, pp. 1-22.
Exhibit E, IpLearn-Focus's Response in Opposition to Microsoft's Motion for Summary Judgment, C.A. 3:14-00151-JD, filed Feb. 18, 2015, pp. 1-40.
Exhibit F, IpLearn-Focus's Response in Opposition to Microsoft's Motion for Summary Judgment, C.A. 3:14-00151-JD, filed Feb. 18, 2015, pp. 1-12.
Exhibit G, IpLearn-Focus's Response in Opposition to Microsoft's Motion for Summary Judgment, C.A. 3:14-00151-JD, filed Feb. 18, 2015, pp. 1-29.
Exhibit H, IpLearn-Focus's Response in Opposition to Microsoft's Motion for Summary Judgment, C.A. 3:14-00151-JD, filed Feb. 18, 2015, pp. 1-15.
Microsoft's Reply in Support of Its Motion for Summary Judgment, C.A 3:14-cv-00151-JD, filed Feb. 25, 2015, pp. 1-14.
IPLearn-Focus's Supplemental Claim Construction Briefing, C.A. 3:14-Cv-00151-JD, filed Apr. 13, 2015, pp. 1-8.
Microsoft's Supplemental Briefing Regarding Claim Construction, Case No. 3:14-cv-00151-JD, filed Apr. 13, 2015, pp. 1-5.
Order Re Summary Judgment, Case No. 3:14-cv-00151-JD, filed Jul. 10, 2015.
Videotaped Deposition of David Forsyth, Case No. 3:14-cv-00151-JD, dated May 15, 2015.
Patent Owner IpLearn-Focus, LLC's Preliminary Response to Petition for Inter Partes Review, C.A. IPR2015-00095, Re U.S. Pat. No. 8,475,174, filed Feb. 4, 2015, pp. 1-71.
Decision on Inter Partes Review, C.A. IPR2015-00095, Re U.S. Pat. No. 8,475,174, entered Apr. 17, 2015, pp. 1-31.
Patent Owner IpLearn-Focus, LLC's Response to Petition for Inter Partes Review, C.A. IPR2015-00095, Re U.S. Pat. No. 8,475,174, filed Jul. 2, 2015, pp. 1-69.
Declaration of David Crane, Inter Partes Review, C.A. IPR2015-00095, Re U.S. Pat. No. 8,475,174, entered Jul. 2, 2015, pp. 1-38.
Petitioner's Reply to Patent Owner's Response to Petition for Inter Partes Review, C.A. IPR2015-00095, Re U.S. Pat. No. 8,475,174, filed Sep. 22, 2015, pp. 1-175.
Patent Owner IpLearn-Focus, LLC's Preliminary Response to Petition for Inter Partes Review, C.A. IPR2015-00096, Re U.S. Pat. No. 8,538,320, filed Feb. 4, 2015, pp. 1-66.
Decision Denying Inter Partes Review, C.A. IPR2015-00096, Re U.S. Pat. No. 8,538,320, filed Mar. 4, 2015, pp. 1-16.
Petitioner Microsoft's Request for Rehearing, C.A. IPR2015-000096, U.S. Pat. No. 8,538,320, filed Apr. 2, 2015, pp. 1-12.

(56) References Cited

OTHER PUBLICATIONS

Decision Denying Petitioner's Request for Rehearing, C.A. IPR2015-0000096, U.S. Pat. No. 8,538,320, entered Apr. 17, 2015, pp. 1-5.
Patent Owner IpLearn-Focus, LLC's Preliminary Response to Petition for Inter Partes Review, C.A. IPR2015-00097, Re U.S. Pat. No. 8,538,321, filed Feb. 4, 2015, pp. 1-71.
Decision granting Inter Partes Review, C.A. IPR2015-00097, Re U.S. Pat. No. 8,538,321, entered Mar. 26, 2015, pp. 1-25.
Corrected Patent Owner IpLearn-Focus, LLC's Response to Petition for Inter Partes Review, C.A. IPR2015-00097, Re U.S. Pat. No. 8,538,321, filed Jun. 22, 2015, pp. 1-69.
Declaration of David Crane, Inter Partes Review, C.A. IPR2015-00097, Re U.S. Pat. No. 8,538,321, entered Jun. 22, 2015, pp. 1-36.
Petitioner's Reply to Patent Owner's Response to Petition for Inter Partes Review, C.A. IPR2015-00097, Re U.S. Pat. No. 8,475,321, filed Sep. 22, 2015, pp. 1-175.
Deposition of David Forsyth, Inter Partes Reviews, C.A. IPR2015-00095, and C.A. IPR2015-00097, Re U.S. Pat. No. 8,475,174 and 8,538,321, dated May 13, 2015, pp. 1-296.
Principal Brief of Appellant IpLearn-Focus, LLC, C.A. No. 3:14-cv-00151-JD, dated Sep. 28, 2015.
Final Written Decision for Inter Partes Review, C.A. IPR2015-00097, Re. U.S. Pat. No. 8,538,321, dated Mar. 23, 2016, pp. 1-38.
Final Written Decision for Inter Partes Review, C.A. IPR2015-00095, Re. U.S. Pat. No. 8,475,174, dated Apr. 11, 2016, pp. 1-42.
Microsoft's Response Brief, C.A 3:14-cv-00151-JD, filed Jan. 11, 2016, pp. 1-45.
Reply Brief of Appellant IpLearn-Focus, LLC, C.A. No. 3:14-cv-00151-JD, filed Feb. 12, 2016, pp. 1-38.
Judgement by United States Court of Appeals for the Federal Circuit, *IpLearn-Focus, LLC* v. *Microsoft Corp.*, case No. 2015-1863, dated Jul. 11, 2016, 2 pages.

\* cited by examiner

COMPUTING METHOD AND SYSTEM WITH DETACHED SENSOR IN A NETWORK ENVIRONMENT

CROSS-REFERENCE TO RELATED APPLICATIONS

This is a continuation of U.S. patent application Ser. No. 14/663,947, filed on Mar. 15, 2015, now U.S. Pat. No. 9,224,304, which is a continuation of U.S. patent application Ser. No. 14/017,599, filed on Sep. 4, 2013, now U.S. Pat. No. 9,123,255, which is a continuation of U.S. patent application Ser. No. 13/831,568, filed on Mar. 14, 2013, now U.S. Pat. No. 8,538,321, which is a continuation of U.S. patent application Ser. No. 13/481,821, filed on May 26, 2012, now U.S. Pat. No. 8,475,174, which is a continuation of U.S. patent application Ser. No. 10/694,706, filed on Oct. 28, 2003, now U.S. Pat. No. 8,398,407, which is a continuation of U.S. patent application Ser. No. 10/050,578, now U.S. Pat. No. 6,699,043, filed on Jan. 14, 2002, which is a continuation of U.S. patent application Ser. No. 09/385,795, filed on Aug. 30, 1999, since abandoned, which is a continuation of U.S. patent application Ser. No. 08/689,678, filed on Aug. 13, 1996, now U.S. Pat. No. 5,944,530; all incorporated by reference into this application in their entirety. This application is also related to U.S. patent application Ser. No. 13/831,547, filed on Mar. 14, 2013, now U.S. Pat. No. 8,538,320, which is also incorporated by reference into this application.

BACKGROUND

The present invention relates generally to learning via a computing device, and more particularly to learning method and system using detached sensor.

Both at home and in schools, the computer is gradually becoming a major medium for education. There are many different reasons for this trend. One is the tremendous reduction in the price of a computer, causing it to permeate into almost every household. Though the price of a computer has been dropping, its computation and memory capacity have increased many folds, leading to computer programs with significantly more intelligence and improved user-friendliness. Another reason is that a computer-aided-education system can be very personalized; it can be tailored to the strengths and weaknesses of individual students. This is very hard to achieve in today's educational environment, in part due to the increase in the students-per-instructor ratio. Though computer-aided education system could be very useful, there is still a need for a system and method that could sense a student in a better manner.

SUMMARY

One embodiment of the invention includes computer-implemented method and system in a network environment using at least a display and a detached sensor. Another embodiment provides methods and systems that help a user learn using at least one detached imaging sensor. In yet another embodiment, the present invention provides a computing system and method that automatically consider a user's concentration-sensitive behavior while the user is working on materials.

In one embodiment, the present invention includes a display, a processor, and a detached imaging sensor to sense a first feature of a user regarding a first voluntary behavior of the user to produce a first set of data. The embodiment is further configured to sense a second feature of the user regarding a second voluntary behavior of the user to produce a second set of data. The processor is configured to analyze the first set and the second set of data, and to determine what to present by the display in view of the analyzing.

In one embodiment, the present invention includes a presenter, a non-intrusive sensor, a controller and an indicator. The presenter presents study materials on a subject to a student; the non-intrusive sensor automatically monitors more than once the student's concentration-sensitive behavior while the student is working on the materials; the controller analyzes the student's concentration-sensitive behavior based on one or more rules; and the indicator provides an indication on the student's concentration level based on the analysis. In another embodiment, the present invention reacts according to the indication.

There are a number of examples of the concentration-sensitive behavior that the sensor can monitor. In one embodiment, the sensor monitors the student's volitional behavior, such as his inputs into the computer, his facial expressions, his facial orientations and his eyes. In another embodiment, the sensor monitors the student's involuntary behavior, such as the sizes of his pupils.

The controller analyzes one or more of the above behavior based on one or more rules. These rules are similar to the instructor's "intuition." For example, one rule is as follows: The student has lost concentration in the study materials if for a predetermined period of time, the student's inputs through a mouse have been in a window that does not contain study materials. Another rule is that if the student is not looking at the monitor showing the study materials for a predetermined period of time, the student has lost concentration in the study materials. From the analysis, the system provides an indication on the student's concentration level.

Based on the indication, the system could react accordingly. Different reactions are applicable. Some examples include rewards, punishments, stimulation, and changing the study materials.

In another embodiment, due to the indication, the system asks the student a question, which can stimulate the student and can assess the student's understanding level in the study materials. From the student's response to the question, the system may change to more appropriate study materials and/or presentation style.

The question-asking approach in the above embodiment does not have to be a reaction to the indication. In one embodiment, as the system is presenting study materials to the student, unexpected by the student, the system asks the student a question. After the student responds to the question, the system resumes back to present study materials to the student. In such an embodiment, the question tends to increase the concentration level of the student in the study materials.

In yet another embodiment, the present invention also includes a calibrator, which calibrates the student's concentration-sensitive behavior before the behavior is being monitored to show concentration. One type of calibration establishes the student's behavior when the student is paying attention, and compares it with the student's behavior when the student is working on the study materials. Calibration typically improves the accuracy of the system.

Other aspects and advantages of the present invention will become apparent from the following detailed description, which, when taken in conjunction with the accompanying drawings, illustrates by way of example the principles of the invention.

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION

Figure 1:
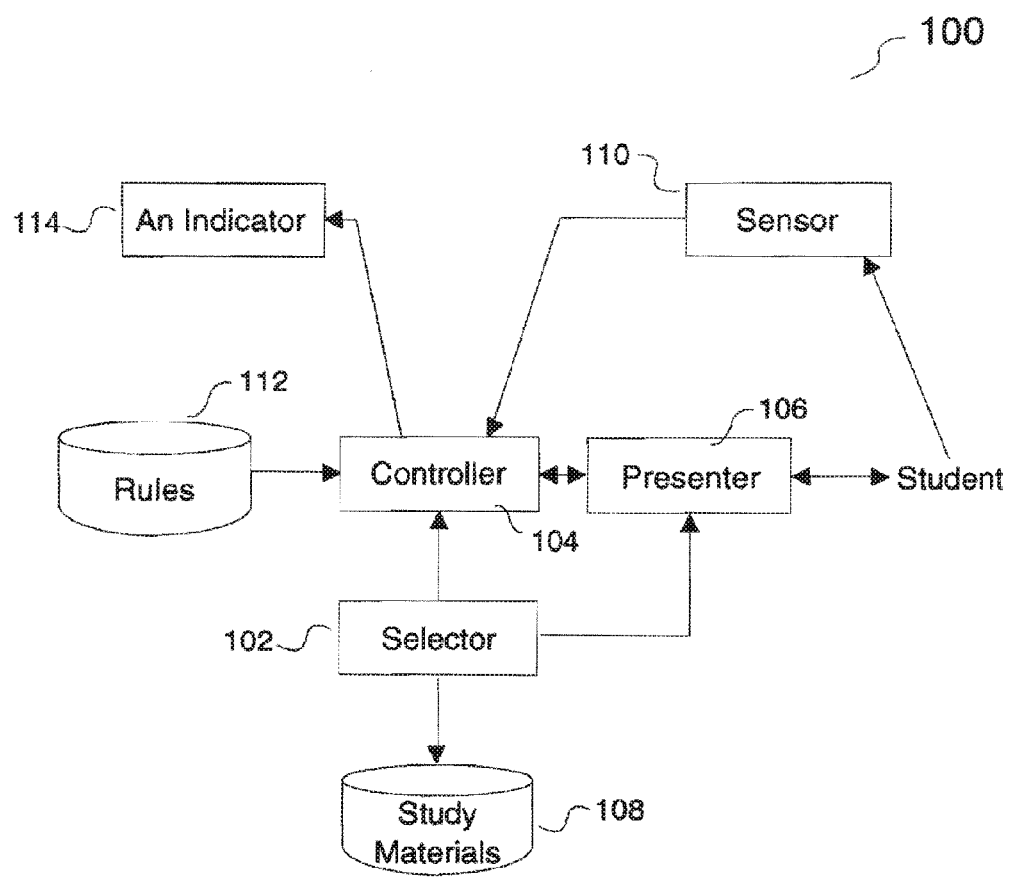
FIG. 1 shows one embodiment of the present invention.

FIG. 1 shows one embodiment of a computer-aided-educational system 100 of the present invention. As an overview of some of its components, the system 100 includes a selector 102, which selects study materials from a study-materials storage medium 108 to be presented to a student through a presenter 106. While the student is working on the study materials, a non-intrusive sensor 110 monitors the student's concentration-sensitive behavior, and sends its results back to a controller 104. Then the controller 104 based on one or more rules from a rules storage medium 112 analyzes the monitored results to provide through an indicator 114, an indication on the student's concentration level. In another embodiment, the selector is 102 also connected to the controller 104 to keep track of the study materials presented to the student.

Figure 2A:
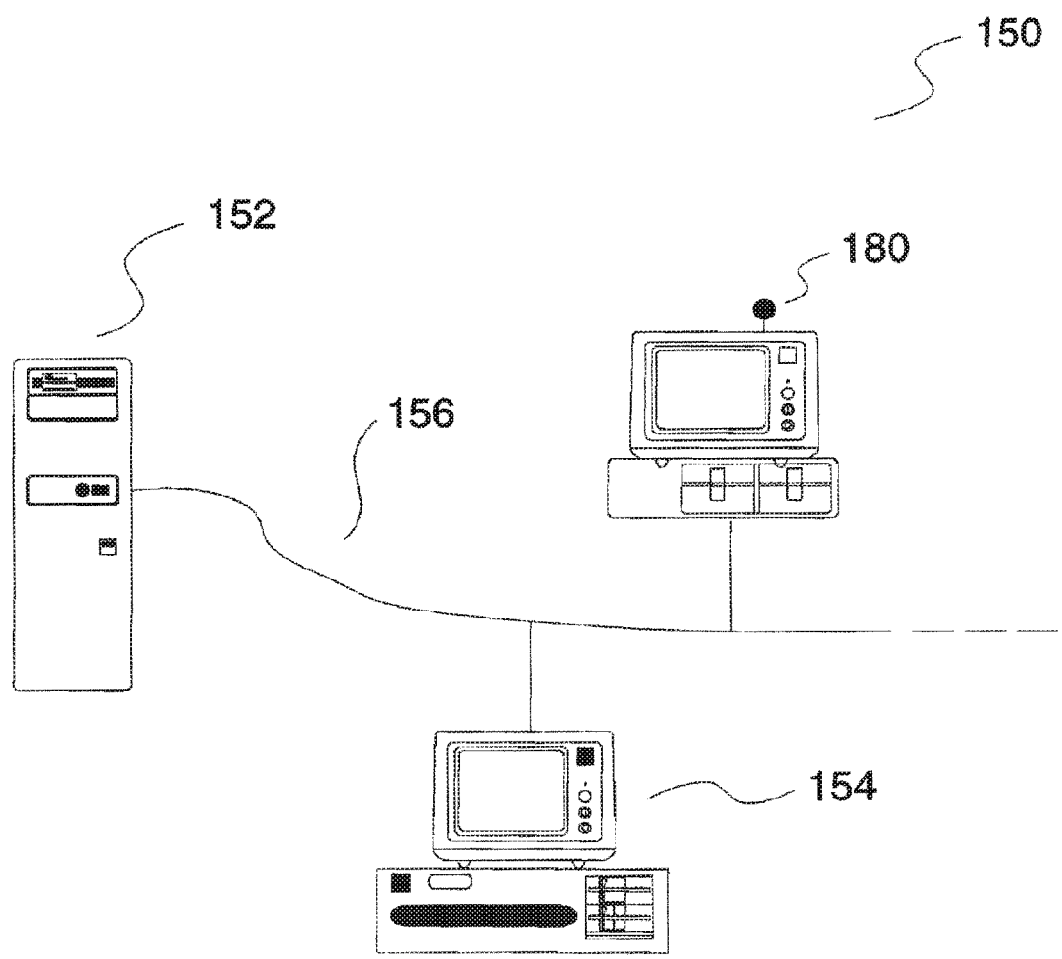
FIGS. 2A-B show one embodiment of a system implementing the present invention.

FIG. 2A shows one embodiment of a system 150 implementing the present invention, preferably in software and hardware. The system 150 includes a server computer 152 and a number of client computers, such as 154, which can be a personal computer. Each client computer communicates to the server computer 152 through a dedicated communication link, or a computer network 156.

Figure 2B:
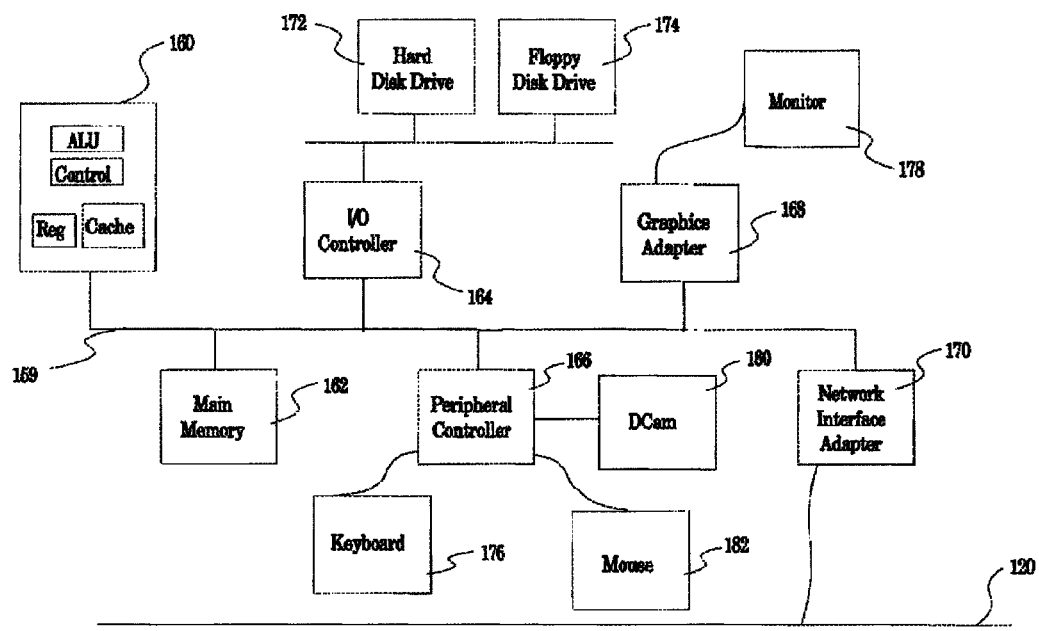

FIG. 2B shows one embodiment of a client computer 154. It typically includes a bus 159 connecting a number of components, such as a processing unit 160, a main memory 162, an I/O controller 164, a peripheral controller 166, a graphics adapter 168 and a network interface adapter 170. The I/O controller 164 is connected to components, such as a harddisk drive 172 and a floppy disk drive 174. The peripheral controller 166 is connected to peripheral components, such as a keyboard 176, a mouse 182, and a digital camera 180. The graphics adapter 168 is connected to a monitor 178; and the network interface adapter 170 is connected to the network 120. The network can be the Internet, an intranet, the world wide web and other forms of networks.

Different components of the present invention can be in different elements shown in FIGS. 2A-B. For example, the presenter 106 and the sensor 110 can be in a client computer; the selector 102, the controller 104, the study-materials storage medium 108, the rules storage medium 112 and the indicator 114 can be in the server computer 152. In another embodiment, the selector 102, the controller 104 and the indicator 114 are also in a client computer. Different components can be in different elements in the above description. Nonetheless, there is no restriction preventing all components to reside in one element, such as a client computer. A number of operations in the present invention can be implemented by software, which is controlled, for example, by the processing unit 160. In yet another embodiment, the number of operations implemented by software can be stored in a storage-medium, which can be, for example, the main memory 162 or a CD read-only-memory.

The present invention is applicable to teach any subject or materials that can be taught by a computer. The teaching period may last one semester or a year, or just one class session. The materials may cover inter-disciplinary areas, such as electrical engineering and thermodynamics, or computer networking and programming techniques. The materials may just be for training a field engineer on a new product. In the following, mathematics is the subject used to illustrate the present invention.

In one embodiment, the subject is divided into major-topics, with each major-topic subdivided into minor-topics, and with each minor-topic further subdivided into line-items. Each line-item typically covers one well-defined area in the subject. In another embodiment, the subject is further divided into more levels below the line-items; and in a third embodiment, the subject is just divided into line-items.

As an example of line-items, if the major-topic is high school algebra, then it can be divided into the following line-items, with bracketed terms served as comments:

High School Algebra (the major-topic)
(Minor-topics under the major-topic)
Decimal Numbers
Polynomials
Linear Equations
Quadratic Equations
...
Integers
(Line-items under the minor-topic of integers)
Addition & Subtraction (Difficulty level 1)
Multiplication (Difficulty level 2)
Division (Difficulty level 2)
Prime Numbers (Difficulty level 3)
Factorization (Difficulty level 3)
Common Divisor (Difficulty level 4)
...
Fractions
(Line-items under the minor-topic of fractions)
Addition & Subtraction (+/−) with Common Denominator (Difficulty level 3)
+/− with Integers (Difficulty level 4)
+/− without Common Denominator (Difficulty level 5)
Multiplication and Divisions (*,/) with Integers (Difficulty level 5)
*,/ with fraction (Difficulty level 6)
Compound Fractions (Difficulty level 6)
Fraction Reduction (Difficulty level 7)
Ratios and Proportions (Difficulty level 7)
...
Another example with the minor topic being differential calculus is as
Calculus (major topic)
Differential calculus (minor topic)
Fractions (Difficulty level 1)
Polynomials (Difficulty level 1)
Exponential Functions (Difficulty level 1)
Differentiation (Difficulty level 2)
Differentiate a sum (Difficulty level 3)
Differentiate a product (Difficulty level 3)
Differentiate a quotient (Difficulty level 4)

In one embodiment, each line-item has a difficulty level. The bracketed difficulty level next to each line-item in the above example indicates how difficult one line-item is relative to other line-items in the subject, or how significant one is relative to another. A line-item with a low difficulty level is a relatively easy line-item or a relatively less important line-item. Typically, a student learning a subject starts from learning line-items at the lowest difficulty level.

The lists of items in the above examples are generated based on expert knowledge on the subject of mathematics. With the proper instruction, such as through reading the present specification, generating such lists with the difficulty levels should be obvious to experts in the subject. The more knowledgeable the expert, the more complete the sets of items.

In one embodiment, each line-item is represented by a line-item root, which includes the line item and its root. In the above example, the root of a line-item includes its subject, its major topic and minor topic.

In one embodiment, the selector 102 starts the learning process by selecting a line-item with the lowest difficulty level. If there are a number of those, one of them is randomly selected. Study materials for that line-item are retrieved from the study-materials storage medium 108 to be presented to the student. After presentation, the selector 102 selects another line-item with the lowest difficulty level among all the un-selected line-items, and the process repeats. For this embodiment, each line-item also includes a mode attribute, which is changed from the un-selected to the selected mode after the study materials for that line-item has been selected to be worked on by the student.

To select a set of study materials from the study-material storage medium 108, the selector 102 sends the line-item root to the storage medium 108 to retrieve the corresponding study materials. Typically, there are a number of sets of study materials in the storage-medium 108, and they can be in the following format:

(line-item root, mode, study materials)

The following serves as examples of study materials for differentiating polynomial:

First, the system teaches the approach to generate derivatives based on the basic principle in differentiation, such as:

$$df(x)/dx = \lim_{h \to 0}((f(x+h)-f(x))/h)$$

Then the system teaches the generalized equation, such as:

$$((d\Sigma a_i x^i)/dx) = (\Sigma i * a_i x^{i-1})$$

Finally, the system teaches the importance of and the way to find optima and minima by solving the following equation:

$$((d\Sigma a_i x^1)/dx) = 0$$

Based on the line-item root, and with one set of study materials per line-item, the selector 102 retrieves from the study-materials storage-medium 108, the corresponding set of study materials. Creating study materials on a subject should be obvious to experts in the subject, and will not be further discussed in this application.

The selector 102 then sends the retrieved study materials to the presenter 106. The study materials can be a document with no questions, arranged as a list of screens. The presenter 106 typically includes the monitor 178, which presents the study materials to the student, who can go from one screen to another with the keyboard 176, or the mouse 182. In another embodiment, the study materials are broadcast through a radio. As the student is working on the study materials presented through the radio, the student's concentration-sensitive behavior is monitored automatically.

In another embodiment, the study materials only have questions. Typically, students gain a better understanding on a subject through actively working on questions than through passively reading study materials. In one embodiment, each question is embedded in a question entry, which is of the following format:

(line-item root, mode, question-body, answer).

The term "question-body" describes the body of a question. The following serves as an example:

Subject: Mathematics.
Major-topic: High School Algebra.
Minor-topic: Fraction.
Line-item: +/− with common denominator
Mode: Un-selected
Answer Question-body
28/37 What is the sum of 2/37, 3/37, 8/37 and 15/37?
−2/43 17/43−25/43+6/43=?

The selector 102 sends to the study-materials storage medium 108 the line-item root to retrieve the set of questions with the same line-item root.

An example of study materials with questions are for the line-item of differentiating exponential functions. A number of questions are generated, including the question on expanding an exponential function based on Taylor expansion, the question on differentiating the Taylor-expanded exponential function, whose answer is the original Taylor-expanded exponential function, and the question on differentiating the exponential function, whose answer is the exponential function.

In another embodiment, the study materials include study materials with questions and study materials without questions.

Note that the formats of the study materials may change as the student progresses. The student can learn one line-item based on questions, and another based on study materials with no questions. As an example, for differential calculus, of the different line-items, all of them can be learnt through either study materials with or without questions, except for the line-item of differentiation, which is typically learnt without questions. That study-materials cover the general differentiation concept, such as the following:

$$df(x)/dx = \lim_{h \to 0}((f(x+h)-f(x))/h)$$

Figure 3:
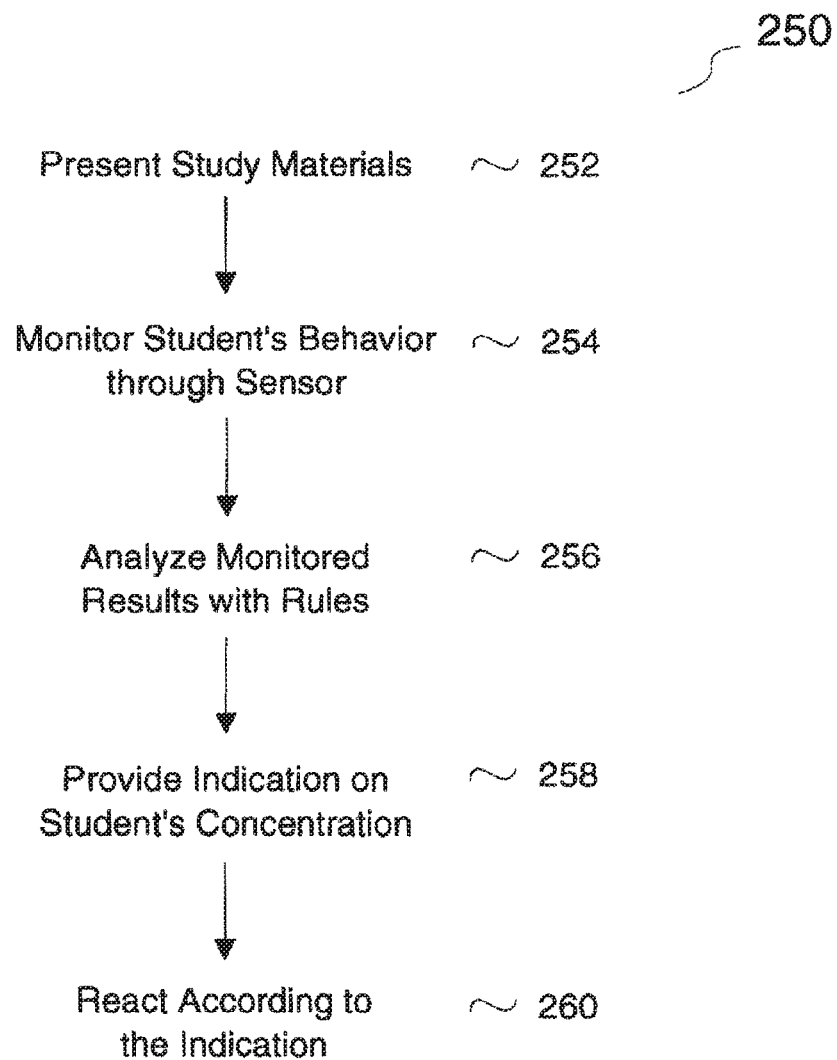
FIG. 3 shows a set of steps to implement one embodiment of the present invention.

FIG. 3 shows a set of steps 250 to implement one embodiment of the present invention. First, the presenter 106 presents (step 252) the selected study materials to the student. As the student is working on the study materials, the sensor 110 monitors (step 254) more than once the student's concentration-sensitive behavior, and feeds those monitored results to the controller. The controller 104 analyzes (step 256) the results based on one or more rules to provide (step 258) an indication on the student's concentration. Based on the indication, the system reacts (step 260) accordingly.

A type of concentration-sensitive behavior is a type of behavior that is sensitive to one's concentration. As one's concentration changes, such a type of behavior changes accordingly. The behavior can be physical, psychological, biological, emotional and physiological.

In the step of monitoring (step 254), the sensor automatically monitors more than once the student's concentration-sensitive behavior while the student is working on the study materials. Instead of just monitoring once to determine concentration level, monitoring more than once increases the accuracy in determining the student's concentration level. For example, a student is concentrating on the study materials. A mosquito lands on the back of his right hand. As the student is trying to hit the mosquito, the system monitors him. The indication based on that image alone is a correct indication of the student's concentration level in the study materials at that specific instant. However, the single measurement is not a good indication of the student's actual concentration level in the study materials—that single measurement is an outlying point that should be deleted. Instead of just one single result, this embodiment monitors more than once the student's behavior, which enhances identifying a pattern to eliminate outlying points.

The monitoring step does not have to stop after monitoring twice. The monitoring step can continue in a periodic manner, such as once every two seconds. In the embodiments of monitoring more than once or monitoring periodically, the results can be analyzed to identify patterns.

The behavior monitored more than once can be of the same type, or can be of different types. In one embodiment, in monitoring more than once, the sensor monitors the same type of behavior each time. In another embodiment, in monitoring more than once, the sensor monitors more than one type of behavior; for example, a first monitoring process is on one type of behavior, and a second monitoring process is on another type of behavior. In monitoring more than one type of behavior, the sensor may include more than one type of sensor, which can monitor more than one type of behavior substantially simultaneously. Monitoring more than one type of behavior is similar to monitoring one type of behavior more than once, in the sense that both approaches increase the accuracy in determining the student's concentration level.

Figure 4:
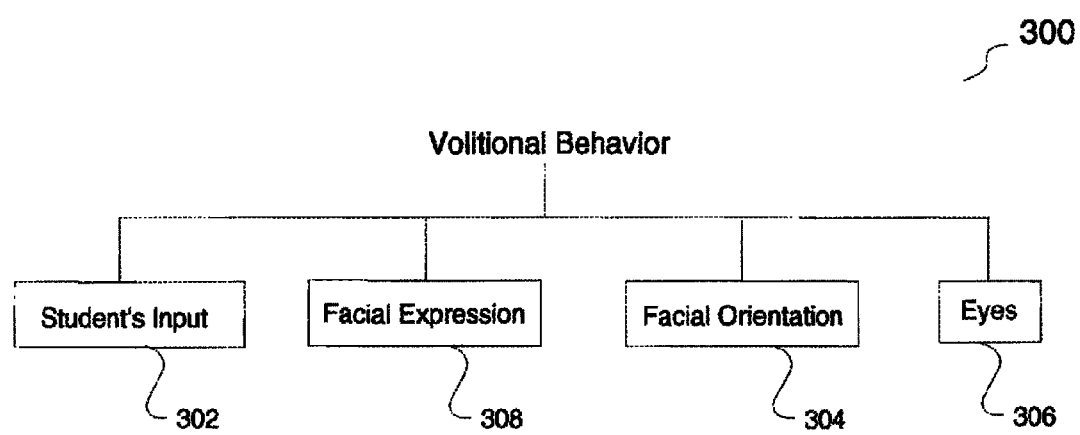
FIG. 4 shows examples of volitional behavior monitored by the sensor in the present invention.

FIG. 4 shows examples of different types of concentration-sensitive behavior, which are volitional 300. In one embodiment, the sensor 110 monitors the student's volitional inputs entered into the computer (box 302). One type of volitional inputs is entered through the keyboard 176 or the mouse 182. The study materials can be presented to the student through the monitor 178. As the student works on the study materials, he enters commands through the keyboard 176 or a position-pointing device, such as the mouse 182, or arrow buttons of the keyboard 176. The inputs may be the downward or upward arrows on the keyboard or the mouse, or may be the typing speed through the keyboard.

In one embodiment, the sensor 110 monitors the speed of inputs by the student as a function of time. There are different ways to monitor the speed of inputs, such as polling periodically the corresponding devices of those inputs. Such monitoring process should be obvious to those skilled in the art, and will not be further described.

As the student starts working on the study materials, the inputs are entered at a certain speed. As the student gets tired, or as the student loses concentration, this speed typically decreases. In this embodiment, the student's input speed is compared with a reference speed to identify changes.

There are a number of methods to determine the reference speed. In one embodiment, this reference speed is set through randomly sampling many students. Based on the students' responses on similar study materials, a reference speed is determined. In another embodiment, the student's initial speed becomes the reference speed. This initial speed may be found for example by averaging the student's speed across five minutes, such as from the first one minute to the first six minutes of the student's usage.

Different types of study materials typically have different reference speeds. For example, if the study materials include no pictures, the input speed may be slow because the student has to read an entire screen of text. If the student has to compose a sentence, the speed is likely to have frequent short pauses because the student has to think to compose the sentence. To accommodate such variations, in one embodiment, the reference speed is a function of the difficulty level of the study materials. As the student progresses in working on the study materials, the difficulty level of the study materials typically increases. In one embodiment, the reference speed is divided by the following factor:

(The difficulty level of the study material*a constant).

With the above equation, as the difficulty level increases, the reference speed decreases accordingly. In this embodiment, the reference speed tracks the difficulty level of the study materials.

As discussed above, by monitoring the speed of the student's inputs, the system 100 can provide an indication of the student's concentration. Thus, one rule is as follows:

If the speed of the student's volitional inputs across a predetermined period of time is significantly lower than the reference speed, the student has lost concentration in the study materials.

In one embodiment, the predetermined period of time is two minutes; and more than three times slower is considered as significantly lower.

In another embodiment, the study materials are presented through a multi-windows environment. The student enters inputs into the system, such as through a position-pointing device, like the mouse 182, or through the keyboard 176. In one embodiment, the sensor 110 in this embodiment is implemented through software, which periodically, such as every two seconds, polls the operating system or the device drivers of the position-pointing device. The polling determines if there have been any inputs. Writing such software to monitor such inputs to the system should be obvious to those skilled in the art, and will not be further described in this application. In such an embodiment, one rule is as follows:

If for a predetermined period of time, the inputs have been entered outside the window where the study materials reside, the student has lost concentration in the study materials.

In yet another embodiment, the study materials are presented in a window environment that has a focus window, and the sensor 110 can sense the focus window, for example as in the above embodiment. In such an embodiment, one rule is as follows:

If the study materials are not in the focus window for a predetermined period of time, the student has lost concentration in the study materials.

In one embodiment, the predetermined amount of time is more than one minute. If monitoring is performed every three seconds, in one minute, the system would have performed 20 measurements.

In yet another embodiment, the sensor 110 senses another type of volitional behavior, which is based on the student's face. In this embodiment, the monitor 178 presents study materials. The sensor 110 including the digital camera 180 are positioned adjacent to the monitor 178, as shown, for example in FIG. 2A. With the camera positioned where it is, when the student is looking at the monitor to work on the study materials, the digital camera 180 could take digital images of the student's face. Taking the digital images to generate numerous bits of data should be obvious to those skilled in the art and will not be further described in this application.

To improve the performance of this embodiment, before the step of monitoring, the present invention includes the step of calibration through imaging. One calibration technique enters the student's image before the student works on the study materials, and uses that image as the reference to compare with other images. For example, before the student starts working on the study materials, he is asked to look at the monitor 178 with a message box having a message such as "LOOK AT ME," and with a picture of two eyes staring at the student. Then, the digital camera 180 takes a reference image of the student's face, who typically looks at the two eyes.

The reference image should be analyzed. That image includes not only the student's face, but also background information, such as the wall of a room. In one embodiment, the controller assumes that the student's two eyes are looking at the two eyes in the monitor. Based on this assumption, the student's face is determined. Such image recognition techniques are disclosed for example in "Computer Recognition of Human Faces," written by Takeo Kanada, and published by Birkhauser Verlag, Basel and Stuttgart, in 1977. Even if the distance between the monitor and the student's face increases, the relative distances among different features on his face remain the same. In one embodiment, the monitoring step focuses on relative distances to re-calibrate the student's face. Such image recognition techniques should be obvious to those skilled in the art, and will not be further described in the present application.

One type of facial information is the facial orientation (box 304). The controller 104 connected to the digital camera 180 calibrates the facial orientation when the student is looking at the monitor 178. This reference image could be just the oblong shape of the face. After calibration, when the student starts working on the study materials, the digital camera 180 regularly captures the facial image, such as once every few seconds. All information in that image is removed leaving behind the orientation of the face. These orientations are compared with the reference image to check for differences. The distance between the monitor and the student's face may change. To compensate for such changes, in one embodiment, the controller uses the ratio of the longest horizontal to the longest vertical distance of the oblong shape. If the captured facial orientation is significantly different from the reference facial orientation, the student is not looking at the monitor. The student may be looking away from the computer or drooping while falling asleep. In such an embodiment, one rule is as follows:

If the student's facial orientation is significantly different from its reference image as shown in two consecutive monitoring processes, the student has lost concentration in the study materials.

In one embodiment, two images are considered significantly different if their horizontal-to-vertical-distance ratios differ by more than 20%.

Another type of facial information is the condition of the eyes (box 306). If the eyelids are covering significant portions of the irises, the student's eyes are closing. In such an embodiment, one rule is as follows:

If the eyelids cover more than 60% of the irises as shown in two consecutive monitoring processes, the student has lost concentration in the study materials.

Another type of facial information is the student's facial expressions (box 308), such as whether the student is frowning or not. In such an embodiment, one rule is as follows:

If the student frowns in two consecutive monitoring processes, the student is concentrating on the study materials.

Concentration-sensitive behavior can be involuntary. In one embodiment, the sensor 110 monitors the sizes of the student's pupils, assuming that a student's pupil dilates if the student loses focus and concentration. In such an embodiment, one rule is as follows:

If the average size of the student's pupils dilates by more than 20% as compared to the average size of the reference image for a predetermined amount of time, the student has lost concentration in the study materials.

Other examples of involuntary concentration-sensitive behavior include the student's heart beat, breathing rate, body temperature and whether the student's sweat has increased. With appropriate sensors and rules, these involuntary behavior can be monitored to provide indications on whether the student has lost concentration in the study materials.

There are many other types of concentration-sensitive behavior. Different types of behavior coupled with their corresponding sensors and rules should be able to indicate the student's concentration level.

More than one type of the student's concentration-sensitive behavior can be monitored by one or more sensors. In fact, one type can be volitional, with the other type involuntary. Including different types of behavior tends to increase the accuracy of identifying the student's concentration level. With more than one type of behavior being monitored, the system may not have to monitor each type of behavior more than once to identify the student's concentration level. An example of a rule for such an embodiment is as follows:

If the student's facial orientation is different from the reference image by more than 20% while the student's eyelids are covering more than 60% of the irises, the student has lost concentration in the study materials.

Such rules should be obvious to experts in the field of human perception, and will not be further described in this application.

The above embodiments describe whether the student has lost concentration or not. However, the invention is also applicable to indicate the student's degree of concentration, such as ranging from low, medium to high. For example, if the student has not lost concentration in the study materials for a long period of time, the student's concentration level is high. Another example is that if the student's eyes are wide open with his inputs through the mouse moving down the study materials in a fairly constant speed for a long duration of time, such as five minutes, the student's concentration level is also high.

In another embodiment, if the controller 104 decides that the student has not lost concentration for a long period of time, such as ten minutes, the controller 104 averages the captured results during that time frame—with outlying points removed—and treats the averaged results as the reference, which will be used to compare with subsequent captured results, to determine if the student has lost concentration in the study materials. The reference can be a reference image, such as the student's face, or the student's input speed, as appropriately modified by the study materials' difficulty level, or other monitored results. As the student continues working on study materials, this reference can be updated regularly by averaging it with subsequent captured results, which also show that the student has not lost concentration. Unlike many of the previously described references, which are static, this type of reference is typically not a constant, and is known as a dynamic reference. It is usually more closely tailored to the student. With more data used to generate the dynamic reference, its accuracy is typically better than the static references.

In yet another embodiment, the system 100 asks for the student's identity, such as the student's name, when the student starts working on the study materials. After the student enters his identity, it is stored in the system 100. The student's reference information, whether static or dynamic, is stored with the student's identity in the memory of the system 100, such as its harddisk. After the first working session, if the student wants to work on study materials through the system 100 again, the system retrieves from its memory the student's reference information. For such an embodiment, the retrieved reference information can replace the step of calibration. If the reference is of the dynamic type, the retrieved information is regularly updated.

Based on one or more of the above concentration-sensitive behavior coupled to one or more appropriate rules, the indicator 114 provides an indication on the student's concentration (step 258), or the student's degree of concentration. Such indication can be as simple as changing the state of a register—a high logic level indicates the student has not lost concentration, while a low logic level indicates the student has. Another indication can be printing a report indicating that the student's degree of concentration in the study materials for a period of time.

In one embodiment, the system reacts according to the indication (step 260). Some examples of reactions include stimulation, rewards, punishments or changing the study materials.

If the indication is that the student has lost concentration in the study materials, one way the controller 104 can help the student to re-focus on the study materials is through stimulation. This includes presenting a real-life application of the study materials that the student has lost concentration in. The stimulation can be through sound. It can be visual effects, including changing the screen temporarily and then restoring to the previous screen.

Another type of stimulation includes allowing the student to play a game. This stimulation is applicable if the student has been working on the study materials for a long duration of time, and should have a break. Thus, after the student has worked for a long period of time, such as 45 minutes, and is losing concentration in the study materials, the controller can pose the student a question, such as, "Do you want to take a break and play a game?" If the student wants to, in one embodiment, the controller accesses a game from the study-materials storage medium, which includes a number of games. The game serves as a diversion. Not only does it distract the student's mind for some time, the game also relaxes and entertains the student. After the game, presentation is resumed on the study materials.

Another form of reaction is a reward. If the student has been concentrating for a long period of time, at the end of a section in the study materials, the system reacts by praising the student audibly through a speaker, or visually through the monitor with words like "TIME FOR A SNACK!" Other examples of rewards include playing a short piece of music, presenting a joke, a factoid on an interesting subject, or playing a short animation or video clip.

A further form of reaction is punishment. This includes generating a report indicating that the student has lost concentration for a long period of time so that the student's supervisor can punish the student accordingly. Another punishment may be an audible reprimand, such as "PAY ATTENTION!"

The system can also change the study materials according to the monitored results. If the student has lost concentration in working on the study materials for a predetermined amount of time, the system can react by changing the study materials to a different set of materials. Also, the presenter 106 may change the presentation style accordingly, such as by reducing the speed of presentation through increasing the line spacing of the text or the size of the image to present to the student.

In yet another embodiment, due to the indication, the system asks the student a question. This question can stimulate the student, and help the student to re-focus in the study materials. Typically, the question is based on the study materials just presented to the student.

As a side note, while the controller 104 through the sensor 110 monitors the student's concentration-sensitive behavior, the controller 104 can also track the corresponding study materials being presented to the student. Such an embodiment has the added benefit of tying the indication with the corresponding study materials presented to the student.

Back to the embodiment that asks the student a question, this embodiment can be achieved, for example, through the selector 102 sending to the study-materials storage medium 108 the line-item root of the study materials just presented. From the line-item root, a set of questions with the same line-item root is retrieved, and one of those question is randomly selected for the student. Other ways may be used to generate a question on materials just presented to the student. One simple way is to randomly select a sentence that has just been presented to the student, and change the syntax of that sentence into a question.

The embodiment on asking questions has a number of benefits. Even if the student does not know the answer to the question, typically, the student is stimulated by the question. Also, the question can be used to assess the student's understanding level on the materials just presented to the student. After the student answers the question, if the answer is correct, the controller 104 can praise the student appropriately. If the answer is not correct, the student may not understand what has just been presented. The controller 104 has a number of options. For example, the study materials just presented can be presented to the student again; the location as to where he can find the answer to the question can be presented to the student; the location of the answer can be hyperlinked to the location of the wrong answer if the student activates an icon shown on the presenter 106; the presenter 106 presents study materials that are easier than the one just presented to the student, such as one with a lower difficulty level; or the presenter 106 can resume presenting, and ignore the wrong answer altogether.

Figure 5:
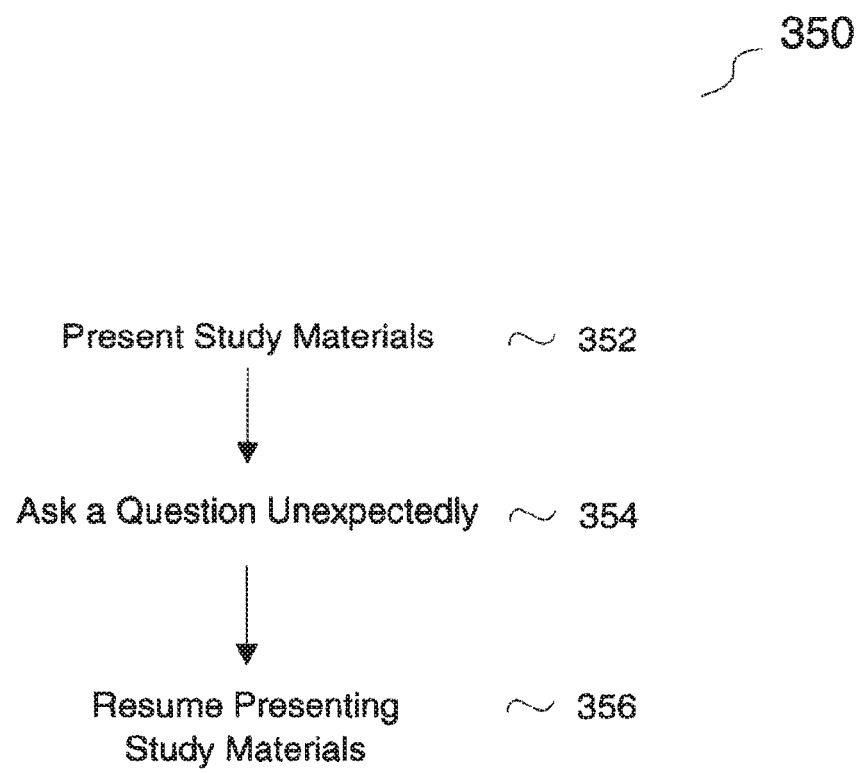
FIG. 5 shows another embodiment of the present invention.

The above embodiment on asking questions can be modified to focus on increasing the student's concentration level. FIG. 5 shows such an embodiment 350. The system presents (step 352) study materials to the student. Then, the system asks the student a question unexpectedly (step 354). As an example, if the study material is presented through the monitor, unexpectedly, the entire screen changes. From a screen of study materials, the system suddenly changes the screen to display a question. The unexpected nature of the change, together with the displaying of the question stimulate the student. To further enhance the effect of stimulation, the system can spell out the question while displaying it. Typically the question is based on the study materials the student has been working on. After the student responds to the question, the system resumes (step 356) presenting the study materials to the student.

The question stimulates. Right before the question is presented, the student may be concentrating or may not be concentrating. Either way, the student, unlikely to be aware that a question is coming, is suddenly confronted with a question. Independent of whether the student knows the answer, the question typically increases the student's concentration level. Also, responding to a question is an active learning approach, as compared to the passive learning approach of reading. The more active learning approach together with the unexpected nature of the question tend to increase the student's memory retention in the subject matter covered by the question.

Another benefit provided by the question is that the student's answer to the question provides an indication on the student's understanding level in the study materials. As described above, if the answer is wrong, the system can go over that part of the study materials, or can reduce the difficulty levels of the study materials to be presented to the student. In another embodiment, the question is just for increasing concentration; the system ignores the answer, and continues on with the presentation.

The student might have stopped working on the study materials altogether. For the embodiment that monitors the student's inputs, if there is no inputs for a predetermined amount of time, such as ten minutes, the system assumes that the student has totally stopped working on the study materials.

The present invention teaches sensing through different types of non-intrusive sensors, which are defined as sensors that do not cause the student physical pain and suffering when they are sensing the student's concentration-sensitive behavior. As technology progresses, sensors that are intrusive today can become non-intrusive in the future, for example, sensors that monitor the student's brain waves, which can be a type of concentration-sensitive behavior.

Rules are stored in the rules storage medium. However, in one embodiment, the rules have previously been embedded in the software implementing the present invention. With rules already embedded in the software, there is no need for accessing the rules, and there is no need for the system to have the rules storage medium.

In the above embodiments, the student's behavior is monitored more than once before the step of analysis. In another embodiment, the monitoring step and the analysis step are intermixed. Instead of monitoring more than once and then analyzing the results, in this embodiment, the sensor monitors one type of behavior, with the result analyzed. Then the sensor monitors the same or a different type of behavior, with the result analyzed.

In yet another embodiment, the steps in the present invention repeat. For example, after the step of reacting according to the indication (step 260) or providing an indication (step 258), the invention repeats from the step of monitoring automatically (step 254). In this embodiment, study materials are continually presented to the student, although the study materials might be changed due to the reaction (step 260).

The rules discussed can be self-adapting. In other words, the controller 104 can change a rule after applying the rule to a number of situations and after analyzing the results. This can be done, for example, in a fussy-logic system.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:
1. A computing apparatus comprising:
a storage unit;
an imaging sensor; and
a processor operatively connected to the imaging sensor and the storage unit,
wherein the storage unit storing a plurality of instructions that, when executed by the processor, cause the processor to:
acquire, in a first session, a first set of measurements produced from the imaging sensor sensing a first feature of a user in the first session, regarding a first behavior of the user, the first feature relating to the head of the user, the imaging sensor detached from the first feature when sensing the first feature, and the first set of measurements to include a plurality of images of the first feature of the user;
store data based on the first set of measurements in the first session, with the store including to link the stored data to an identity of the user;
present, in the first session, materials in a multi-window environment, by a first window in a display;
change what is to be presented by the first window in the display, with the change including to pause presenting the materials by the first window in the display;
resume to present the materials in the display in view of another set of measurements produced from the imaging sensor sensing the user, with the resume including to re-start presenting the materials paused;
acquire, in a second session, which is after the first session, a second set of measurements produced from the imaging sensor sensing the user;
access, in the second session, the stored data based on the stored data being linked to the identity of the user; and
compare the accessed stored data and data based on the second set of measurements to identify materials for presentation in the second session by a window in the display,
wherein the plurality of instructions, when executed by the processor, further cause the processor to perform, before the first session, a calibration process on at least an image of the user, with the calibration process using the imaging sensor, and with the present, in the first session, depending on the calibration process.

2. A computing apparatus as recited in claim 1, wherein at least some materials presented by the display in the first session depends on analyzing data based on measurements produced from the imaging sensor sensing the user, together with data based on measurements produced from another sensor in the computing apparatus regarding another behavior of the user.

3. A computing apparatus as recited in claim 2, wherein the another behavior of the user is an involuntary behavior of the user.

4. A computing apparatus as recited in claim 1, wherein the change what is to be presented depends on identifying, by the processor, the user not paying attention to materials presented by the display.

5. A computing apparatus as recited in claim 4, wherein the resume to present depends on the another set of measurements suggesting the user paying attention to materials presented by the display.

6. A computing apparatus as recited in claim 1, wherein the first feature includes a facial orientation of the user.

7. A computing apparatus as recited in claim 1, wherein the first feature includes at least one eye of the user.

8. A computing apparatus as recited in claim 1, wherein at least some of the materials presented by the display in the first session are retrieved, using a network interface unit in the computing apparatus, via a network external to the computing apparatus.

9. A computing apparatus as recited in claim 1, wherein the plurality of instructions, when executed by the processor, further cause the processor to determine a position on the display based on measurements produced from the imaging sensor sensing the user in the first session.

10. A computing apparatus as recited in claim 1, wherein the plurality of instructions, when executed by the processor, further cause the processor to control movement of some materials on the display based on measurements produced from the imaging sensor sensing the user in the first session.

11. A non-transitory computer readable storage medium comprising a plurality of instructions, the plurality of instructions executable by a computing apparatus to result in the computing apparatus:

acquiring, in a first session, a first set of measurements produced from an imaging sensor in the computing apparatus sensing a first feature of a user in the first session, regarding a first behavior of the user, the first feature relating to the head of the user, the imaging sensor detached from the first feature when sensing the first feature, and the first set of measurements to include a plurality of images of the first feature of the user;

storing data based on the first set of measurements in the first session, with the storing including linking the stored data to an identity of the user;

presenting, in the first session, materials in a multi-window environment, by a first window in a display;

changing what is to be presented by the first window in the display, with the changing including pausing presenting the materials by the first window in the display;

resuming presenting the materials in the display in view of another set of measurements produced from the imaging sensor sensing the user, with the resuming including re-starting presenting the materials paused;

acquiring, in a second session, which is after the first session, a second set of measurements produced from the imaging sensor sensing the user;

accessing, in the second session, the stored data based on the stored data being linked to the identity of the user; and comparing the accessed stored data and data based on the second set of measurements to identify materials for presentation in the second session by a window in the display, wherein the plurality of instructions executable by the computing apparatus to further result in the computing apparatus performing, before the first session, a calibration process on at least an image of the user, with the calibration process using the imaging sensor, and with the presenting, in the first session, depending on the calibration process.

12. A non-transitory computer readable storage medium as recited in claim 11, wherein at least some materials presented by the display in the first session depends on analyzing data based on measurements produced from the imaging sensor sensing the user, together with data based on measurements produced from another sensor in the computing apparatus regarding another behavior of the user.

13. A non-transitory computer readable storage medium as recited in claim 12, wherein the another behavior of the user is an involuntary behavior of the user.

14. A non-transitory computer readable storage medium as recited in claim 11, wherein the changing what is to be presented depends on identifying, by the computing apparatus, the user not paying attention to materials presented by the display.

15. A non-transitory computer readable storage medium as recited in claim 14, wherein the resuming presenting depends on the another set of measurements suggesting the user paying attention to materials presented by the display.

16. A non-transitory computer readable storage medium as recited in claim 11, wherein the first feature includes a facial orientation of the user.

17. A non-transitory computer readable storage medium as recited in claim 11, wherein the first feature includes at least one eye of the user.

18. A non-transitory computer readable storage medium as recited in claim 11, wherein at least some of the materials presented by the display in the first session are retrieved, using a network interface unit in the computing apparatus, via a network external to the computing apparatus.

19. A non-transitory computer readable storage medium as recited in claim 11, wherein the plurality of instructions executable by the computing apparatus to further result in the computing apparatus determining a position on the display based on measurements produced from the imaging sensor sensing the user in the first session.

20. A non-transitory computer readable storage medium as recited in claim 11, wherein the plurality of instructions executable by the computing apparatus to further result in the computing apparatus controlling movement of some materials on the display based on measurements produced from the imaging sensor sensing the user in the first session.

* * * * *